E. D. ANDERSON.
MACHINE FOR MAKING ADHESIVE PLASTERS.
APPLICATION FILED DEC. 29, 1917.
1,318,714.
Patented Oct. 14, 1919.
9 SHEETS—SHEET 2.
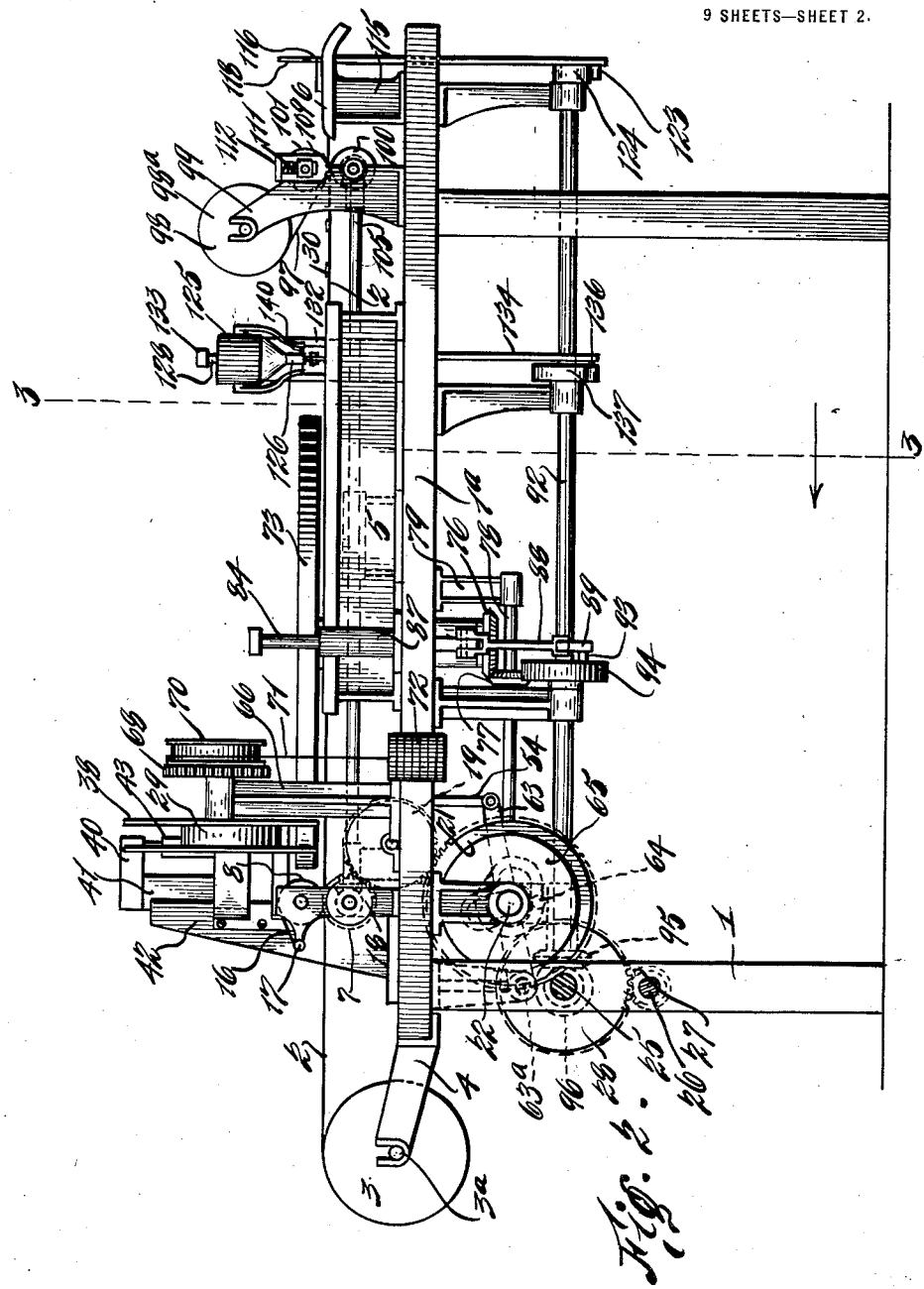
Inventor
E. D. Anderson
By his Attorney
T. F. Bourne

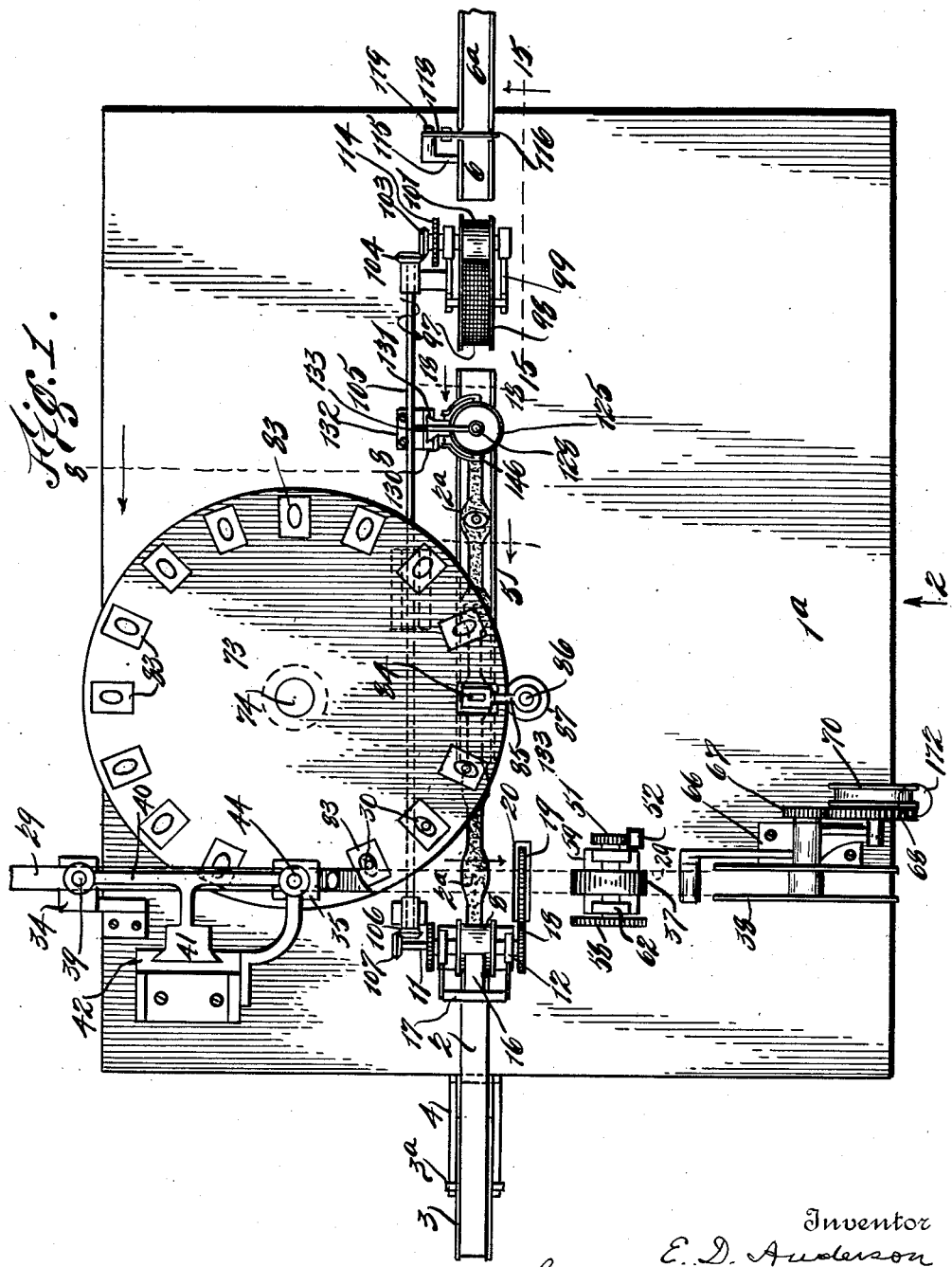

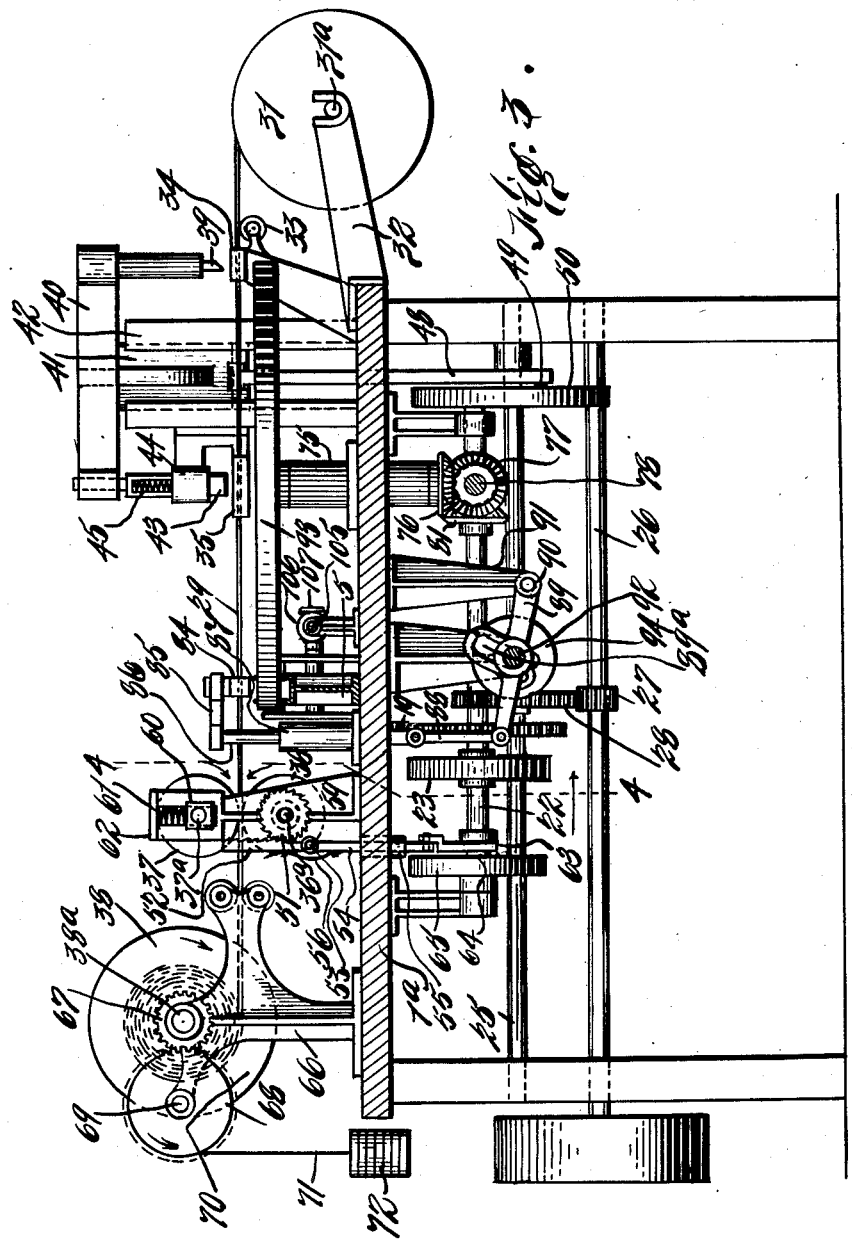

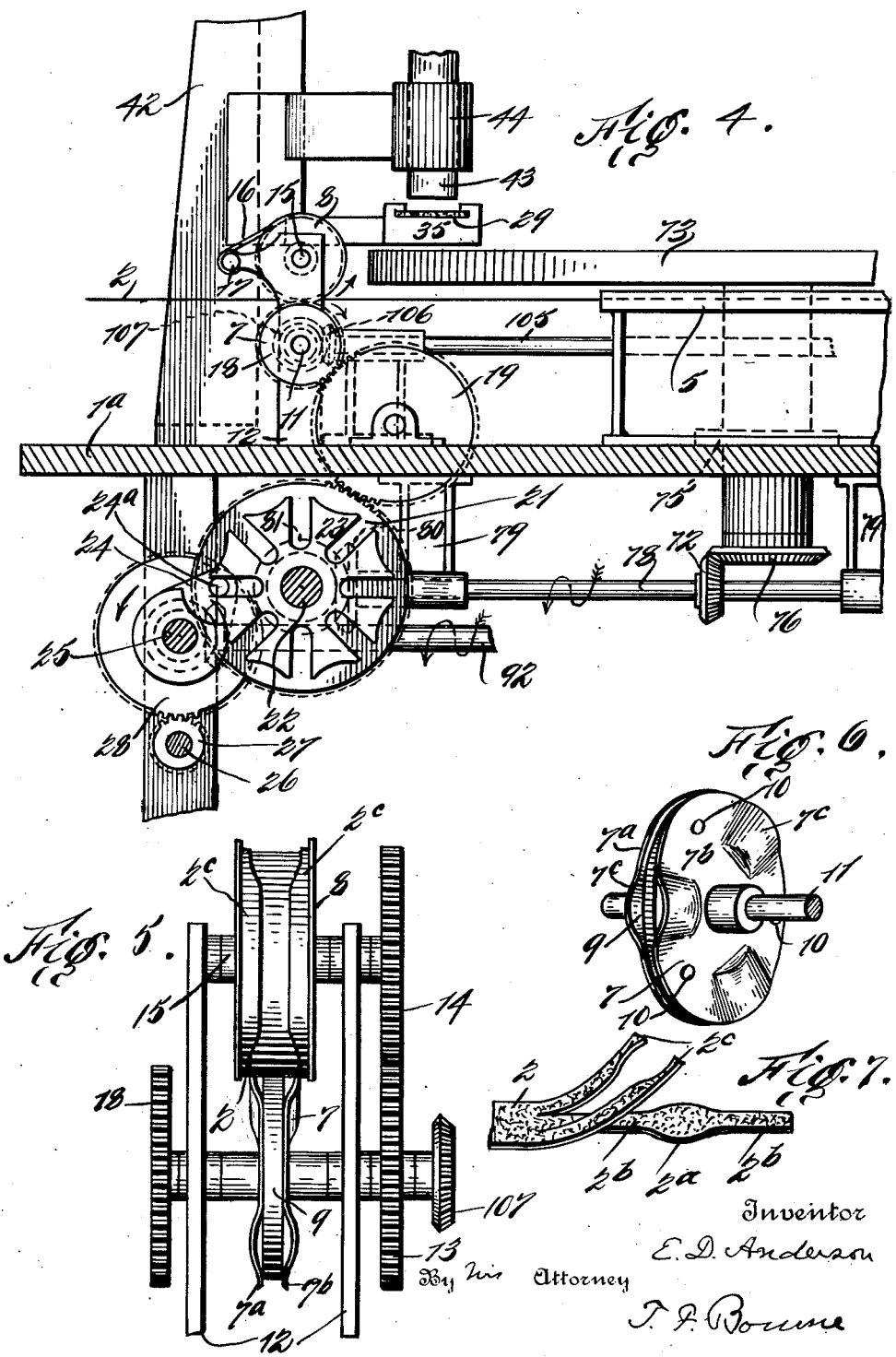

E. D. ANDERSON.
MACHINE FOR MAKING ADHESIVE PLASTERS.
APPLICATION FILED DEC. 29, 1917.
1,318,714.
Patented Oct. 14, 1919.
9 SHEETS—SHEET 5.
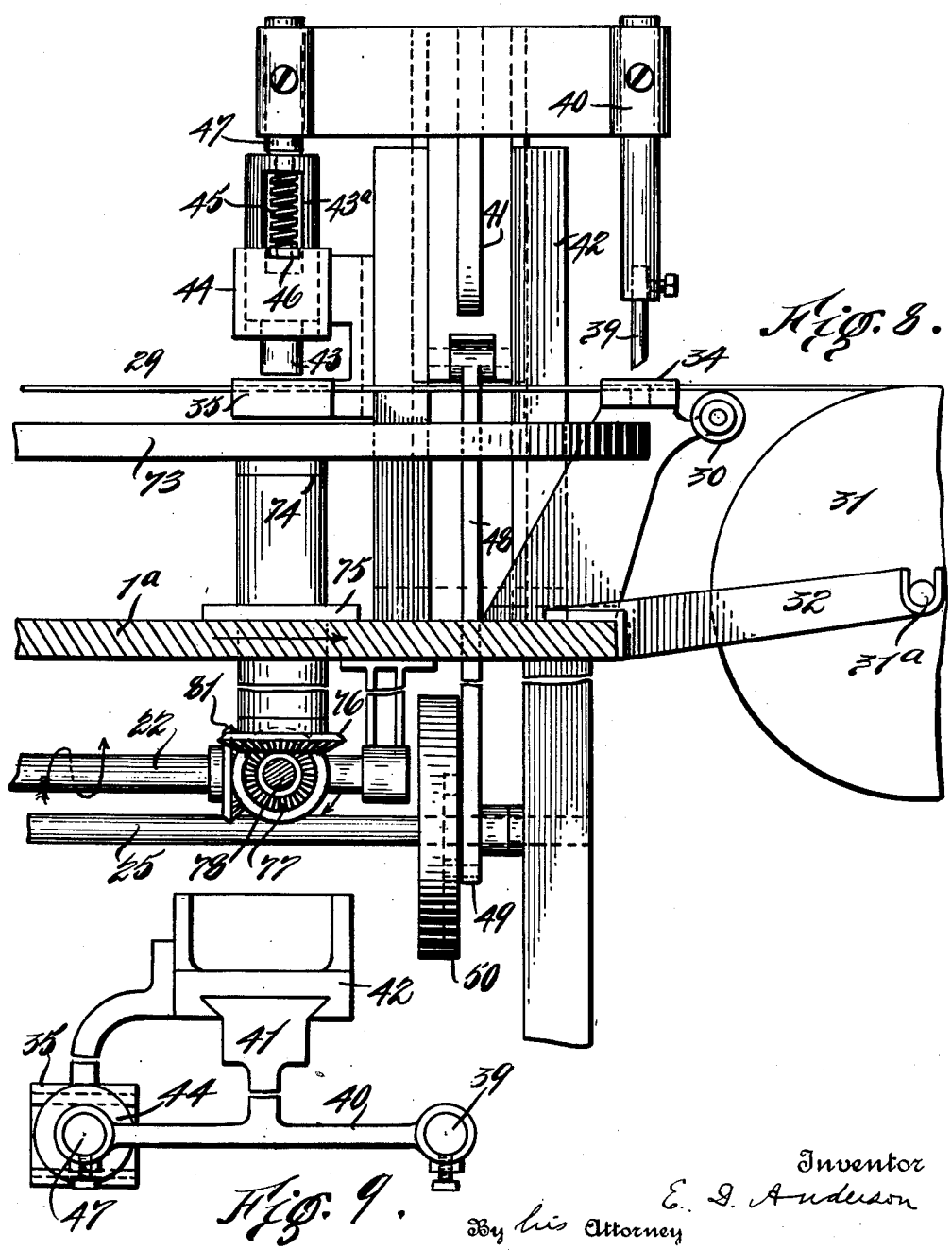

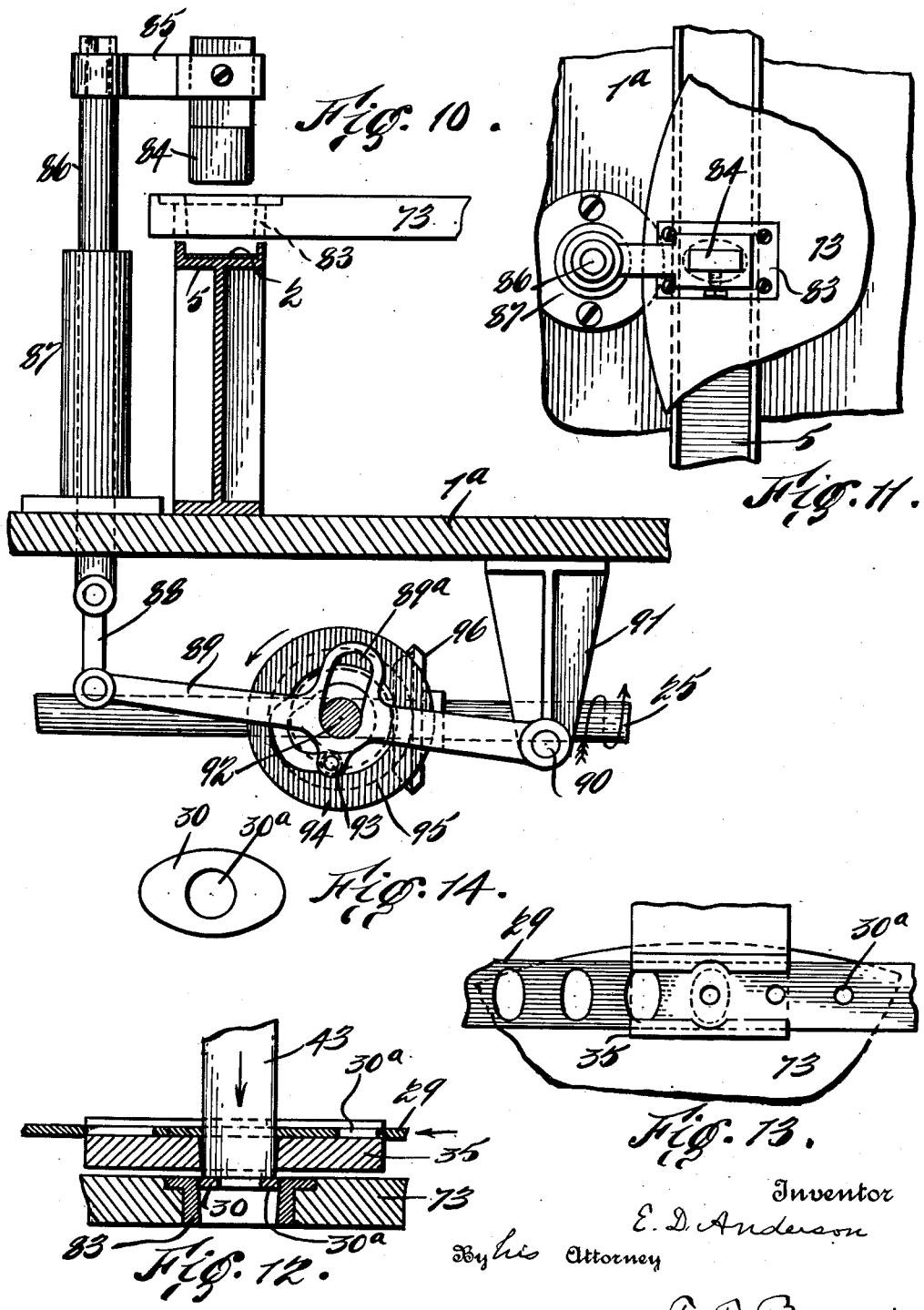

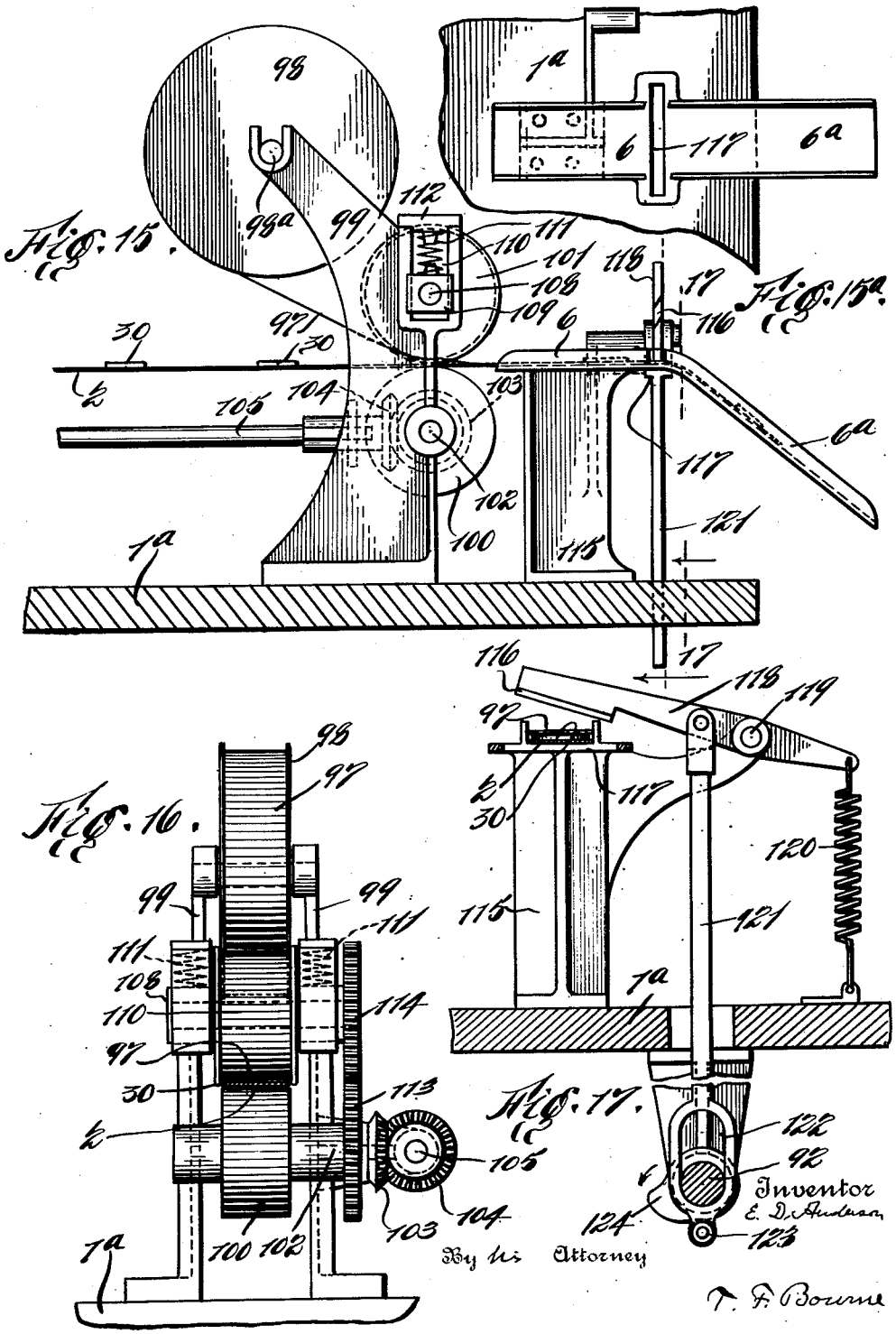

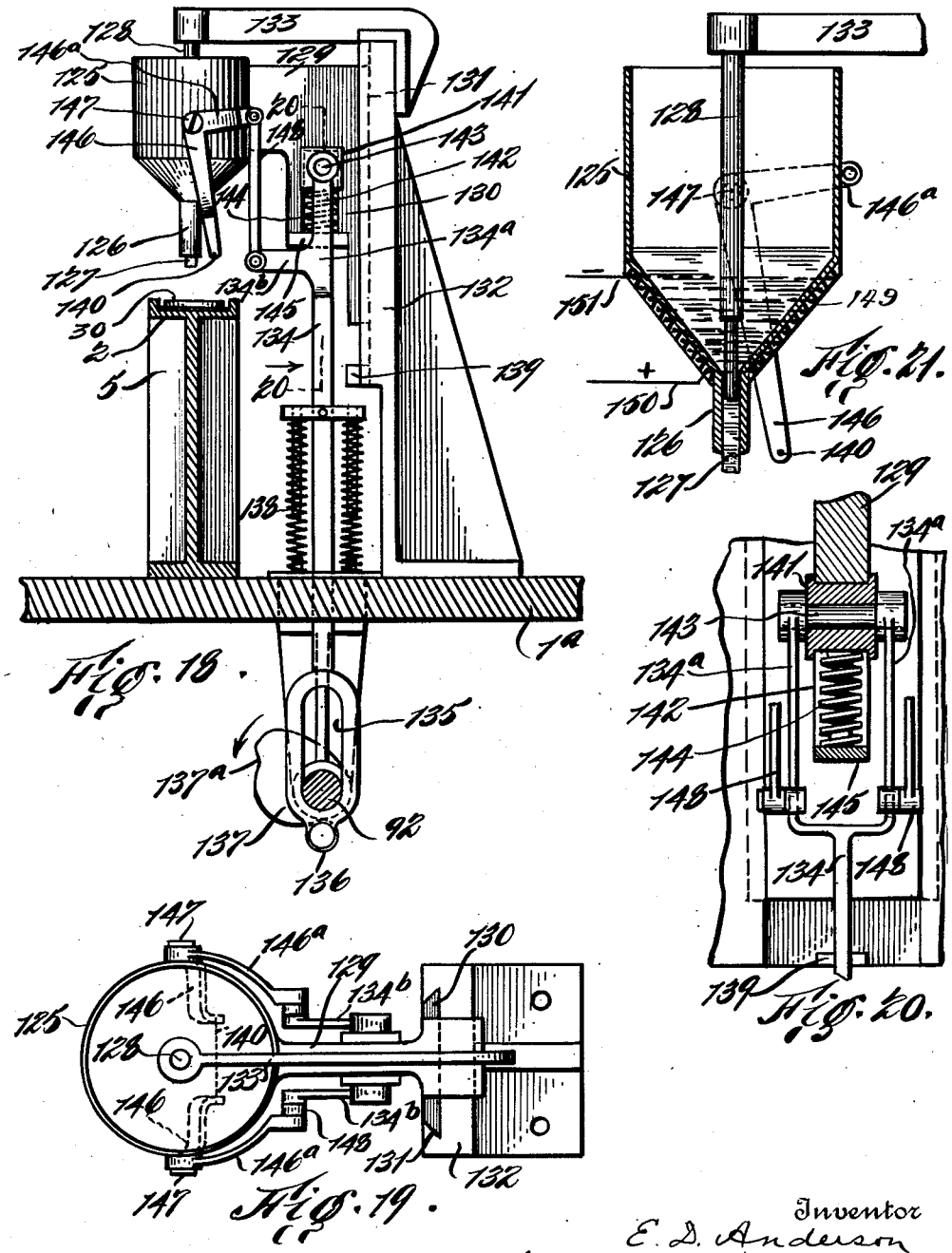

E. D. ANDERSON.
MACHINE FOR MAKING ADHESIVE PLASTERS.
APPLICATION FILED DEC. 29, 1917.
1,318,714.
Patented Oct. 14, 1919.
9 SHEETS—SHEET 9.
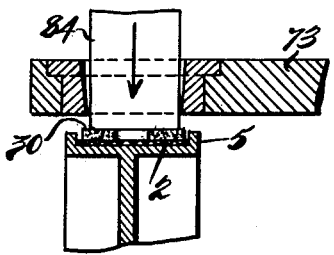
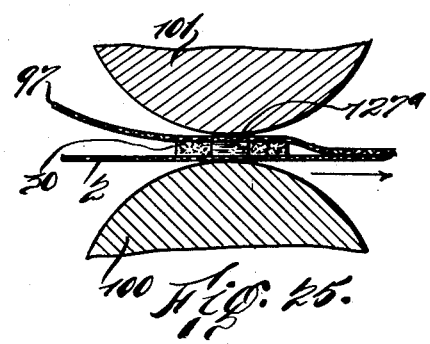
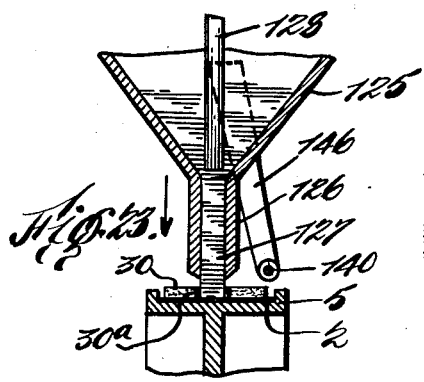
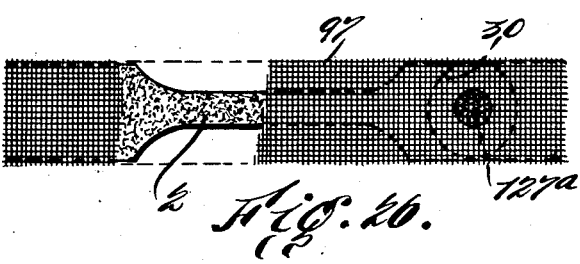
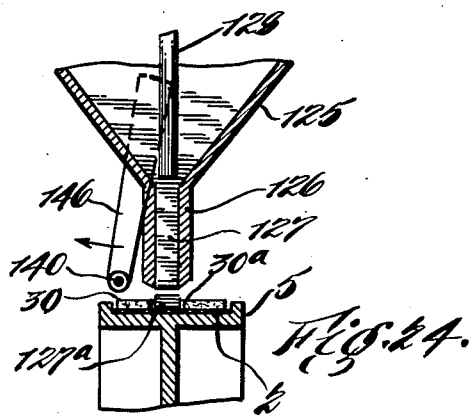
Inventor
E. D. Anderson
By his Attorney
T. F. Bourne

UNITED STATES PATENT OFFICE.

ERNEST D. ANDERSON, OF NEW YORK, N. Y., ASSIGNOR TO E. D. ANDERSON, INC., OF NEW YORK, N. Y., A CORPORATION OF NEW YORK.

MACHINE FOR MAKING ADHESIVE PLASTERS.

1,318,714.  Specification of Letters Patent.  Patented Oct. 14, 1919.

Application filed December 29, 1917. Serial No. 209,482.

*To all whom it may concern:*

Be it known that I, ERNEST D. ANDERSON, a citizen of the United States, and resident of New York city, borough of Manhattan, in the county of New York and State of New York, have invented certain new and useful Improvements in Machines for Making Adhesive Plasters, of which the following is a specification.

The object of my invention is to provide a machine adapted to automatically assemble together various webs or strips of material, to cut the same into desired shape for the production of articles of manufacture, and to deliver the finished product in a successive manner. My invention is particularly adapted for the purpose of producing corn plasters which comprise an apertured pad or disk applied to adhesive plaster, and in some instances a suitable medicament is placed in the aperture in the pad and is covered by an outer fabric, which plasters are of a well known variety.

In carrying out my invention I provide means to supply pads, means to apply the pads upon a strip of adhesive material, which may be cut to the desired shape for the plasters, and means to apply a protecting strip on the adhesive plaster and the pads, and to cut completed plasters from such assembled strips for delivery. I also provide means to measure and apply, when desired, suitable medicament in the apertures of the pads upon the adhesive plaster to be covered by said protecting strip. By the means described several strips may be fed, cut to desired shape, assembled together, and the plasters cut off and delivered successively in a continuous manner, and automatically, without requiring machine operators to handle the materials.

My invention comprises novel details of improvement and combinations of parts that will be more fully hereinafter set forth and then pointed out in the claims.

Reference is to be had to the accompanying drawings forming part hereof, wherein, Figure 1 is a plan view of a machine embodying my invention; Fig. 2 is a side view of the machine, looking in the direction of the arrow 2 in Fig. 1; Fig. 3 is a cross section substantially on the plane of the line 3, 3, in Fig. 2; Fig. 4 is an enlarged fragmentary section substantially on the line 4, 4, in Fig. 3, looking in the direction of the arrow; Fig. 5 is an enlarged detail edge view, illustrating feeding and plaster-shape cutting-means for a strip of adhesive material; Fig. 6 is a perspective view of the cutter of Fig. 5; Fig. 7 is a detail illustrating the cut plaster strip; Fig. 8 is an enlarged sectional face view illustrating devices for forming the pads to be applied upon the adhesive strip, said figure being taken substantially on the line 8, 8, in Fig. 1, looking in the direction of the arrow; Fig. 9 is a plan view of part of Fig. 8 illustrating means for reciprocatively supporting the punch and die; Fig. 10 is an enlarged sectional view showing means to apply pads upon the adhesive strip; Fig. 11 is a plan view thereof; Fig. 12 is a diagrammatic sectional view enlarged, illustrating means for cutting a strip to form the pads and applying a pad in the receiver of a pad-carrier or turret; Fig. 13 is a fragmentary plan view illustrating the strip for the pads and the female die for producing the pads; Fig. 14 is an enlarged detail plan view of one of the pads for the corn plaster; Fig. 15 is an enlarged sectional side view illustrating mechanism for assembling the protecting strip over the pads on the adhesive strip, and the cutter to sever the finished plasters from such strips, the section being taken substantially on the line 15, 15, in Fig. 1; Fig 15ª is a detail plan view of part of Fig. 15; Fig. 16 is an edge view, illustrating strip assembling and feeding rolls looking from the righthand side of Fig. 15; Fig. 17 is a section substantially on the line 17, 17, in Fig. 15; looking in the direction of the arrows; Fig. 18 is an enlarged sectional detail view, illustrating means for applying medicament to the pads, the section being taken substantially on the line 18, 18, in Fig. 1; Fig. 19 is a plan view thereof; Fig. 20 is a detail view, partly in section substantially on the line 20, 20, in Fig. 18; Fig. 21 is an enlarged sectional view of the receptacle or pot for the medicament; Fig. 22 is a sectional detail illustrating means for applying pads upon the adhesive strip; Figs. 23 and 24 are detail sectional views illustrating steps in applying the medicament in a pad; Fig. 25 is a diagrammatic sectional detail view illustrating means for assembling and feeding strips and a pad containing medicament; and Fig. 26 is an enlarged plan view of the completed corn plaster, part being broken away.

Similar numerals of reference indicate corresponding parts in the several views.

A suitable main frame for the machine is indicated at 1, which may be of any desired construction. Upon the top 1ª thereof various devices hereinafter referred to may be supported. At 2 is a strip of tape suitably supported to be fed, as hereinafter described, which may be a strip of well-known adhesive plaster, to form part of the corn plasters hereinafter described, (Figs. 1, 7 and 26). Said strip or tape may be supplied on a reel 3 carried by a spindle 3ª journaled upon a bracket 4 supported by the main frame, which strip passes thence along a suitable guide 5 on said frame, whence it passes to a guide 6 spaced from guide 5 and supported upon the main frame (see Figs. 1, 2, 3, 10 and 15). I have shown means to feed said strip intermittently or step by step, and since the corn plasters shown are to be cut to desired shape, I have illustrated means for cutting the strip to such shape and simultaneously feeding it, while removing surplus material from the strip. A rotary strip cutter and feeder is indicated at 7, and an opposed roll is indicated at 8, between which the strip 2 is adapted to pass (Figs. 1, 2, 4, 5 and 6). The cutter 7 is shown comprising spaced disks 7ª, 7ᵇ having a circular spacing disk 9 therebetween of less diameter than said disks 7ª, 7ᵇ, said disks being secured together by rivets 10 (Figs. 5 and 6). The disks 7ª, 7ᵇ are shown widened or bent in opposite directions at 7ᶜ, the latter parts opposing in pairs, and the edges of said disks 7ª, 7ᵇ may be sharpened so that when strip 2 passes between the rotary cutter 7 and the opposing roll 8 said strip will be severed in a longitudinal direction to produce widened portions 2ª thereon to receive pads, spaced along the strip between narrower portions 2ᵇ thereof formed by such cutter, from which corn plasters will be cut (Figs. 2 and 7). The cutter 7 is carried by a shaft 11 journaled in supports 12 carried by frame 1, (Fig. 5). Shaft 11 is shown provided with a gear 13 in mesh with a gear 14 secured upon the shaft 15 of feeding roll 8, and shaft 15 is shown journaled in supports 12, whereby said cutter 7 and roll 8 may be rotated together to feed and cut strip 2 therebetween. Since the surplus material 2ᶜ cut from the sides of strip 2 by the cutter 7 is liable to adhere to roll 8 because, in the example illustrated, the side of the strip bearing the adhesive material opposes said roll, I have provided a stripper 16 shown supported at 17 upon supports 12, and bearing at its free end upon roll 8 (Figs. 1, 2 and 4), whereby, as said roll rotates, the surplus material 2ᶜ will slide over said strip and be detached from said roll, to be removed in any desired manner. I have shown means for rotating cutter 9 and roll 8 step by step to feed strip 2 step by step to correspond to other operations of the machine. To cause such step by step operations of said cutter and roll I have provided the following devices: A gear 18 secured on shaft 11 is in mesh with a gear 19 shown operative in an opening 20 in table 1ª, gear 19 being in mesh with a gear 21 secured on a shaft 22 (Figs. 1, 4 and 5). The gear 19 and shaft 22 are supported in suitable bearings on the main frame. Upon shaft 22 is secured the toothed member 23 of a Geneva movement, with which the projection 24ª of arm 24 of such movement coöperates, arm 24 being secured upon a shaft 25 journaled on the main frame (Figs. 2 and 4). A drive shaft 26 journaled upon the main frame is shown provided with a pinion 27 in mesh with a gear 28 secured on shaft 25, whereby as shaft 26 is rotated the Geneva member 23 will be rotated step by step, and through the gearing described the cutter 7 and roll 8 will be correspondingly rotated.

At 29 is indicated a strip of suitable material, such as of felt, from which pads 30 (Figs. 12, 13 and 14) are to be cut. The strip 29 is shown mounted to travel transversely with respect to and over strip 2, for which purpose I have shown the following devices: The strip 29 may be supplied on a reel 31 having a spindle 31ª suitably journaled upon bracket 32 carried by the main frame, which strip passes over a guide roll 33 and through or over a female die 34 supported on the main frame, and thence through or over a second female die 35 supported by the main frame (Figs. 1, 3, 4, 8 and 12). From die 35 said strip passes over a strip 2 and between feeding rolls 36, 37 to a takeup reel 38 supported upon the main frame (Figs. 1 and 3.) In the example illustrated it is desired to punch spaced holes 30ª in strip 29 to serve as openings in the pads 30 to receive medicament (Figs. 12, 13, 14) when the pads have been placed upon adhesive strip 2. For such purpose a male punch 39 coöperates with die 34, which punch is shown carried by an arm 40 projecting from a block 41 guided in a suitable way or bearing 42 on the main frame, and whereby when said punch descends step by step it will punch spaced holes in strip 29 which is to be fed step by step. A punch 43 coöperates with die 35, suitably spaced from punch 39, for punching out perforated portions of strip 29 to produce the pads 30. Punch 43 is adapted to be operated with punch 39 and is shown reciprocative in a guide 44 carried by the main frame (Figs. 3, 4 and 8). I have shown punch 43 provided with an inner recess 43ª receiving a coil spring 45, which bears at one end against the upper portion of the punch, and at the lower end against the stop 46 on guide 44, whereby said spring tends normally to raise the punch from die 35 (Fig. 8). Arm 40 is shown provided with a projection 47 adapted to operate upon punch 43 to push it toward die 35, and spring 45 tends to raise block 41 and both punches. I have shown means to operate or reciprocate said punches, for which purpose I have shown block 41 pivotally connected with a rod or link 48 having a projection 49 coöperative with a suitable cam 50 secured upon shaft 25 (Figs. 3 and 8), whereby as said shaft is rotated said punches will be reciprocated in timed relation to step by step movements of strips 2 and 29.

To feed strip 29 step by step the feeding rolls 36, 37 are rotated step by step as follows: Upon the shaft 36ª of roll 36 is secured a ratchet wheel 51 (Fig. 3) coöperative with ratchet pawl or dog 52 that is shown pivotally supported at 53 upon a reciprocative rod or bar 54 suitably guided in a bearing 55 on the main frame. A spring 56 carried by bar 54 and bearing against pawl 52 tends to keep the latter in coöperative relation with ratchet 51. A gear secured upon shaft 36ª is in mesh with a gear 58 secured upon shaft 37ª of roll 37. Shaft 36ª is suitably journaled in spaced brackets or uprights 59 on table 1ª (Figs. 1 and 3), and shaft 37ª is journaled in boxes 60 that are guided on said brackets and are normally pressed downwardly by springs 61 bearing against said boxes and against caps 62 on said brackets, whereby proper pressure of said rolls upon strip 2 is maintained. Rod 54 is shown pivotally connected with a lever 63 (Figs. 2 and 3), which may be forked or slotted to receive shaft 22, and is shown pivotally supported upon the main frame at 63ª. Lever 63 is provided with a projection 64 coöperative with a cam 65 secured on shaft 22, whereby as said shaft rotates step by step, by means of the Geneva movement described, pawl 52 will be reciprocated to cause rotation of feeding rolls 36, 37 step by step for correspondingly feeding strip 29. Any suitable means may be provided to dispose of the residue perforated strip 29 that passes from the rolls 36, 37. For such purpose I have shown a takeup reel 38 to receive perforated strip 29, the spindle of said reel being journaled upon a bracket 66 on frame 1, said spindle being provided with a gear 67 in mesh with a gear 68, whose shaft 69 is journaled upon said bracket 66, and is secured to a drum 70 upon which a cord or the like 71 is wound and supports a weight 72. Said weight tends continually to rotate reel 38 to wind the strip 29 on said reel as the strip is fed. The arrangements so far described are such that as strips 2 and 29 are fed step by step the punches 39 and 43 will respectively punch holes in strip 29 for each pad 30, and will punch each pad therefrom for each step of the strips.

Pads from strip 29 are to be placed upon the adhesive strip 2 in spaced relation thereon. For such purpose I have shown means to receive the pads 30 from die 35, and transfer them successively to position over strip 2 and means to deposit the pads on said strip. At 73 is a carrier or turret for said pads rotatively carried by frame 1, being shown provided with a shaft 74 journaled in a bearing 75 upon table 1ª and provided with a gear 76 shown below said table. Gear 76 is in mesh with a gear 77 secured upon shaft 78 shown journaled in bearings in brackets 79 hung upon the main frame, which shaft is provided with a gear 80 in mesh with a gear 81 secured upon shaft 22 (Figs. 2, 3 and 4), whereby as shaft 22 is rotated step by step said carrier or turret 73 will be correspondingly rotated step by step. Carrier 73 is provided with spaced receivers or pockets 83 (Figs. 1, 10 and 12) adapted to pass over strip 2 and beneath and to register with die 35 to receive pads 30 therefrom when punch 43 cuts the pads from strip 29 and pushes them into the receivers 83 successively. The receivers 83 are shown provided with openings tapering or inclined downwardly to temporarily retain pads 30 therein when plunger 43 recedes therefrom, (Fig. 12). The carrier, during rotation, moves the pads from beneath die 35 and carries them to a depositing position over strip 2, in register with a plunger 84. (Figs. 1, 3 and 10), that is located opposite the guideway 5 and strip 2 thereon. The plunger 84 is to be operated in timed relation to the step by step movement of strip 2 and carrier 73, for which purpose I have shown said plunger secured upon an arm 85 carried by a rod 86 that is reciprocative in a bearing 87 on table 1ª, the lower end of which rod is shown pivotally connected by a link 88 with a lever 89 (Figs. 3 and 10). Said lever is shown pivotally supported at 90 on bracket 91 carried by the main frame, which lever is shown slotted at 89ª to receive a shaft 92. Lever 89 is shown provided with a projection 93 coöperative with a cam 94 secured upon shaft 92. Shaft 92 is shown provided with a gear 95 in mesh with a gear 96 secured on shaft 25 (Figs. 2 and 10), whereby as shaft 25 is rotated the cam 94 will cause reciprocation of the plunger 84 to push successive pads 30 from carrier 73 to deposit the pads successively in spaced relation upon the adhesive strip 2 successively (Fig. 2).

After the pads 30 have been placed upon strip 2, a protecting fabric strip 97, such as of gauze or the like, is applied upon said strip and over the pads thereon, to adhere to the strip 2 and to the resulting corn plasters. The protecting strip 97 is shown carried by a reel 98 whose shaft 98ª is journaled in bearings on spaced brackets 99 secured upon the main frame (Figs. 1, 2, 15 and 16). At 100 and 101 are opposed pressing and feeding rolls between which the strips 2 and 97 with the interposed pads 30 pass. The rolls 100, 101 are spaced from plunger 84 toward the delivery end of the machine, and are to be rotated in consonance with the cutter 7 and roll 8, for which purpose I have shown shaft 102 of roll 100 provided with a gear 103 in mesh with a gear 104 on shaft 105 (Figs. 1, 2, 4, 15 and 16). Shaft 105 is journaled on suitable bearings on the main frame and is provided adjacent to shaft 11 with a gear 106 in mesh with a gear 107 secured on shaft 11, (Figs 1, 3 and 4). Said gears 103, 104 and 106, 107 are shown so disposed and of such diameters that rotation of shaft 11, during feeding of strip 2, will cause rotation of rolls 100, 101, in the same direction and at the same surface speed as cutter 7 and roll 8, whereby strip 2 is equally fed by both pairs of rolls. The roll 101 is shown spring pressed toward roll 100, for which purpose the shaft 108 of roll 101 is shown journaled in slidable journal boxes 109 guided in ways at 110 on brackets 99, (Figs. 2 and 15,) springs 111 bearing upon said boxes and against caps 112 on said brackets normally tending to push roll 101 toward roll 100. Shaft 102 is shown provided with a gear 113 in mesh with a gear 114 secured on shaft 108 (Figs. 1 and 16), whereby the rolls 100 and 101 will be positively rotated in unison at the same surface speed to press the strips 2 and 97 together and feed them in accordance with the feeding of strip 2 by cutter 7 and roll 8.

The assembled strips 2 and 97 having the pads 30 therebetween are cut off to the desired lengths to form the finished corn plasters, shown on an enlarged scale in Fig. 26. For such purpose I have shown the assembled strips adapted to pass from rolls 100, 101 to guide 6, shown supported by bracket 115 upon the main frame (Figs. 1, 2, 15, 15ª and 17) adjacent to which guide is located a movable cutter or knife 116 adapted to coöperate with a stationary cutting edge 117 of the guide 6 (Figs. 2, 15, 15ª and 17). The cutter or knife 116 is shown carried by a rocking arm or lever 118 shown pivotally supported at 119 upon bracket 115, a spring at 120 connecting lever 118 with the main frame or table and serving to withdraw cutter 116 from the assembled strips 2 and 97, (Fig. 17). Any suitable means may be provided to operate cutter 116 in timed relation to the feeding of the assembled strips 2 and 97. For such purpose I have shown a link or rod 121 pivotally connected with lever 118 and slotted at 122 to receive shaft 92 (Figs. 2 and 17). A projection or roller at 123 upon said link is adapted to coöperate with a cam 124 secured on shaft 92, whereby as said shaft is rotated the link 121 will be actuated to cause operation of cutter 116 in timed relation to the step by step feeding of the assembled strips.

It is sometimes desirable to supply the corn plasters with a suitable medicament located in the holes or openings 30ª of the pads 30, to be retained therein by the assembled strips 2 and 97 of the plasters. I have illustrated means for applying medicament in the openings 30ª of the pads 30 as they are fed with strip 2 before the protecting strip 97 is assembled thereon. For such purposes I have shown a receptacle or pot 125 located over the strip 2 between plunger 84 and assembling and feeding rolls 100, 101. Said receptacle is shown provided with a lower discharge nozzle 126 through which the medicament 127 may pass from the receptacle (Figs. 2, 18, 21, 23 and 24). I have shown means to reciprocate receptacle 125 with relation to a stationary ejector 128 for the medicament, which ejector is adapted to operate within the discharge nozzle 126 of said receptacle. Receptacle 125 is shown carried by an arm 129 projecting from the slidable head or block 130, guided to reciprocate in a guideway 131 in a bracket 132 shown upstanding from table 1ª and secured thereto, (Figs. 2, 18 and 19). The ejector 128 is shown depending from an arm 133 secured upon bracket 132 above receptacle 125, whereby when the receptacle is raised the ejector 128 will enter the discharge nozzle 126, in the nature of a plunger, to push from the discharge orifice or end of nozzle 126 a portion of the medicament sufficient for a dose for a corn plaster, (substantially as illustrated in Figs. 18 and 21), and whereby when receptacle 125 next descends such portion of the medicament projecting from said nozzle will be applied in the hole 30ª of the pad 30 therebeneath (Fig. 23), in position to be cut off and left in said pad, as illustrated at 127ª in Fig. 24. For reciprocating receptacle 125 in timed relation to the placing of pads 30 step by step beneath the same, a rod or link 134 (Figs. 2, 18 and 20) is operatively connected with head or block 130 and depends therefrom, said rod or link being shown provided with a slot or opening 135 receiving shaft 92 and having a projection 136 coöperative with a cam 137 secured on said shaft, (Fig. 18). One or more springs 138 interposed between link 134 and the main frame or table 1ª serve to raise said rod or link, the cam 137 serving to draw down said rod or link, whereby receptacle 125 is reciprocated. To positively limit the downward movement of receptacle 125 so that the discharge orifice of its nozzle 126 will always come to rest at the proper position with relation to a pad 30 therebeneath (Fig. 23), I provide a stop 139 upon bracket 132 to encounter the head or block 130 when it is drawn down by the action of cam 137 (Fig. 18). To successively cut off the portions of the medicament 127 projecting below nozzle 126, each time receptacle 125 has been lowered over a pad 30, I provide a cutter 140 adapted to swing back and forth between nozzle 126 and a pad 30 therebelow (Figs. 23 and 24) after receptacle 125 has come to rest on the down-stroke. I have shown means for operating said cutter through the medium of cam 137 as follows: The rod or link 134 is shown forked at its upper end at 134$^a$ (Fig. 20) and connected with a block 141 guided to slide in a recess 142 in arm 129, said block being shown provided with a pivot or shaft 143 receiving arms 134$^a$ of link 134. A spring 144 interposed between block 141 and cap or stop 145 secured on arm 129 beneath recess 142, serves normally to retain said block and arm or link 134 in operative relation for reciprocating receptacle 125 but permitting rod or link 134 to descend by the action of cam 137, after head or block 130 has been checked in its downward movement by stop 139, for causing operation of cutter 140. The cutter 140 is shown in the form of a wire stretched between arms 146 (Fig. 19) that are shown on opposite sides of receptacle 125 and pivotally supported thereon at 147 to swing relatively thereto, so that the cutter 140 may pass transversely beneath the lower end or discharge orifice of nozzle 126. The arms 146 are shown in the form of bell cranks, their laterally disposed portions 146$^a$ being shown pivotally connected by links 148 with projecting portions 134$^b$ of rod or link 134 (Figs. 18 and 19). The arrangement described is such that when the parts are in the positions shown in Figs. 18 and 21, receptacle 125 will be raised and ejector 128 will have pushed the medicament into nozzle 126, with a portion of the medicament extending therefrom, and the cutter 140 will be at one side of the medicament; when cam 137 rotates, as in the direction of the arrow in Fig. 18, it will cause the descent of receptacle 125 until it is checked by the stop 139, whereupon ejector 128 will be withdrawn from nozzle 126 to permit medicament to enter said nozzle beneath the ejector (Figs. 23 and 24), at which time the part 137$^a$ of cam 137 will have about reached roller 136. Continued movement of said cam will cause its high part of peak to bear on roller 136 and thereby rod or link 134 will be moved downwardly, without moving receptacle 125, and links 148 will be drawn down causing arms 146 to swing and carry cutter 140 laterally beneath the discharge orifice or nozzle 126, substantially from the positions shown in Figs. 18 and 23 to the position shown in Fig. 24, whereupon said cutter will sever the portion of the medicament projecting below nozzle 126 leaving the dose or pellet 127$^a$ of the medicament in the hole 30$^a$ of the pad 30 then upon strip 2 at rest in guideway 5 beneath receptacle 125. Continued advance of cam 137 next permits rod 134 to rise under the influence of springs 138, whereupon arms 146 first will be swung reversely to carry cutter 140 back again to the other side of nozzle 126 (Fig. 23), and continued rise of rod or link 134 will push receptacle 125 with its cutter 140 up again to the top of its stroke. During such upstroke ejector 128 will again enter orifice 126 to push a supply of medicament therefrom, whereupon upon the next rotation of cam 137 such operations will be repeated, and so on. It will be understood that each time strip 2 is brought to rest with a pad thereon beneath receptacle 125, the described operations of depositing the medicament in the hole of such pad are performed, the operations of the receptacle being in timed relation to the moving and resting of strip 2. The medicament 127 may be in the form of a paste or wax-like substance which will not drop off the end of nozzle 126, but will hang there to be cut therefrom. The medicament may be of any suitable kind, and the receptacle 125 may be heated for the purpose of keeping the medicament in suitable condition for application in the pads. Any suitable means may be provided for heating the receptacle, such as an electrical heater indicated by the wire coil 149 suitably supported upon the receptacle and which may be connected with the line wires 150 and 151 from any suitable source of electric energy.

The operation of my improvements may be described as follows: The several strips are mounted and fitted to their feeding devices in manner before described, and the machine being started, said strips are fed step by step and the carrier 73 is rotated step by step. As the strip 2 is fed it is cut to shape by the rotary cutter 7, and each time that the punches 39 and 43 descend a hole 30$^a$ is punched in strip 29 for a pad, and a pad is punched from such strip and deposited in the receiver of carrier 73. When the receiver comes to rest with a pad beneath plunger 84 the latter pushes the pad from the receiver upon strip 2. When the carrier and strips come to rest the punches 39 and 43 and the plunger 84 descend. When the latter rise the carrier and strips are fed, and so on step by step. As the pads are deposited upon adhesive strip 2 they adhere thereto and are stepped along with said strip between rolls 100, 101, whereupon the protecting strip 97 is assembled thereon, and the assembled strips are passed through guide 6, and while the assembled strips are at rest the knife or cutter 116 severs the same transversely for the production of corn plasters successively, and since the strips are fed each time a distance equal to the length of a corn plaster, a plaster will be cut off and delivered each time the assembled strips come to rest, the plasters sliding down the delivery portion 6ª of guide 6 whence they may be removed in any desired manner. When medicament is to be applied in the holes of the pads 30 the receptacle 125 will be moved toward the pad therebeneath, and the cutter 140 will be operated to sever the dose 127ª from the medicament each time the strip 2 is at rest, so that the pads containing the medicament covered by the protecting strip 97 pass along between the rolls 100 and 101.

In accordance with my improvements the parts for the corn plasters may be fed and cut to shape, assembled and cut off automatically, in a continuous and successive manner, without requiring handling of the materials by an operator during their assembly.

While I have illustrated and described a particular arrangement and relation of parts adapted to carry out my invention, it will be understood that the latter is not limited thereto, and that changes may be made, within the scope of the appended claims, without departing from the spirit of my invention, it being understood, also, that the means for forming and applying the pads upon the adhesive strip may be used, if desired, with or without the means for the application thereto of the protecting strip 97, and with or without the means for applying medicament in the pads.

Having now described my invention what I claim is:—

1. The combination of means for supplying and feeding an adhesive strip, means for applying apertured pads in spaced relation upon said strip, and means to apply medicament in apertures in said pads.

2. The combination of means for supplying and feeding an adhesive strip, means for applying apertured pads in spaced relation upon said strip, means to apply medicament in apertures in said pads, and means to apply a protecting strip upon the first named strip and pads thereon over the medicament.

3. The combination of means for supplying and feeding an adhesive strip, means for applying apertured pads in spaced relation upon said strip, means to apply medicament in apertures in said pads, means to apply a protecting strip upon the first named strip and pads thereon over the medicament, and means to sever said strips between said pads.

4. The combination of means to supply an adhesive strip, means to cut said strip to shape and feed the same, and means to apply pads upon wide portions of said strip.

5. The combination of means to supply an adhesive strip, means to cut said strip to shape and feed the same, means to apply pads upon wide portions of said strip, and means to apply a protecting strip over the first named strip and pads thereon.

6. The combination of means to supply an adhesive strip, means to feed said strip, means to supply a second strip, means to feed the second strip relatively to the first named strip, means to cut pads from the second named strip and apply them upon the first named strip, and means to apply a strip upon the first named strip and the pads thereon.

7. The combination of means to supply an adhesive strip, means to feed said strip, means to supply a second strip, means to feed the second strip relatively to the first named strip, means to cut apertured pads from the second named strip and apply them upon the first named strip, means to apply medicament in apertures in the pads on the adhesive strip, and means to apply a strip upon the first named strip and the pads thereon over said medicament.

8. The combination of means to supply and feed a strip, means to supply and feed another strip for pads, means to punch pads from said strip, a carrier having means to receive said pads, means to operate the carrier to present pads over the first named strip, means to deposit pads from the carrier upon said strip, and means to apply a strip upon the first named strip.

9. The combination of means to supply and feed a strip, means to supply and feed another strip for pads, means to punch apertured pads from said strip, a carrier having means to receive said pads, means to operate the carrier to present pads over the first named strip, means to deposit pads from the carrier upon said strip, means to deposit medicament in apertures in said pads, and means to apply a strip upon the first named strip over the pads and medicament thereon.

10. The combination of means to supply and feed a strip, means to supply and feed another strip for pads, means to punch spaced holes in said strip, means to punch pads having holes from the strip, means to apply said pads successively upon the first named strip, and means to apply a strip upon said first named strip and the pads thereon.

11. The combination of means to supply and feed a strip, means to supply and feed another strip for pads, means to punch spaced holes in said strip, means to punch pads having holes from the strip, means to apply said pads successively upon the first named strip, means to apply medicament in holes in the pads on the first named strip, and means to apply a strip upon the first named strip over the pads and the medicament thereon.

12. The combination of means to supply and feed a strip, means to supply and feed another strip for pads, means to punch spaced holes in said strip, means to punch pads having holes from the strip, a carrier having receivers for said pads, means to operate the carrier to present the pads over the first named strip, a plunger to deposit pads from the carrier upon said strip, and means to operate the plunger.

13. The combination of means to supply and feed a strip, means to supply and feed another strip for pads, means to punch spaced holes in said strip, means to punch pads having holes from the strip, a carrier having receivers for said pads, means to operate the carrier to present the pads over the first named strip, a plunger to deposit pads from the carrier upon said strip, means to operate the plunger, and means to apply a strip upon the first named strip and pads thereon.

14. The combination of means to supply and feed a strip, means to supply and feed another strip for pads, means to punch spaced holes in said strip, means to punch pads having holes from the strip, a carrier having receivers for said pads, means to operate the carrier to present the pads over the first named strip, a plunger to deposit pads from the carrier upon said strip, means to operate the plunger, means to apply medicament in the holes of said pads, and means to apply a strip upon the first named strip and the pads and medicament thereon.

15. The combination of means to supply a strip, means to feed said strip step by step, means to supply another strip for pads, means to feed said strip step by step, means to punch pads from said strip between its step by step movements, means to apply said pads upon the first named strip between its step by step movements, and means to apply a strip upon the first named strip and the pads thereon.

16. The combination of means to supply a strip, means to feed said strip step by step, means to supply another strip for pads, means to feed said strip step by step, means to punch holes in said strip, means to punch pads having holes from the strip between its step by step movements, means to apply said pads upon the first named strip between its step by step movements, and means to apply a strip upon the first named strip and the pads thereon.

17. The combination of means to supply a strip, means to feed said strip step by step, means to supply another strip for pads, means to feed said strip step by step, means to punch holes in said strip, means to punch pads having holes from the strip between its step by step movements, means to apply said pads upon the first named strip between its step by step movements, means to apply a medicament in the holes in the pads on said first named strip between its steps, and means to apply a strip upon the first named strip and the pads and medicament thereon.

18. The combination of means to supply and feed an adhesive strip step by step, means to supply and feed a strip for pads step by step, means to punch pads from said strip successively, a carrier having receivers to pass under the punching means to receive pads therefrom and to pass over the adhesive strip to retain said pads thereover, means to operate said carrier step by step relatively to the step by step operations of said strips and punch, and means to deposit pads from said carrier upon the adhesive strip between steps of said carrier and strip.

19. The combination of means to supply and feed an adhesive strip step by step, means to supply and feed a strip for pads step by step, means to punch pads from said strip successively, a carrier having receivers to pass under the punching means to receive pads therefrom and to pass over the adhesive strip to retain said pads thereover, means to operate said carrier step by step relatively to the step by step operations of said strips and punch, means to deposit pads from said carrier upon the adhesive strip between steps of said carrier and strip and means to apply a strip upon the adhesive strip and the pads thereon.

20. The combination of means to supply and feed an adhesive strip step by step, means to supply and feed a strip for pads step by step, means to punch holes in said strip and punch the pads having holes therefrom successively, a carrier having receivers to pass under the punch to receive the pads therefrom and to pass over the adhesive strip to retain said pads thereover, means to operate said carrier step by step relatively to the step by step operations of said strips and punches, and means to deposit pads from said carrier upon the adhesive strip between steps of said carrier and strips.

21. The combination of means to supply and feed an adhesive strip step by step, means to supply and feed a strip for pads step by step, means to punch holes in said strip and punch the pads having holes therefrom successively, a carrier having receivers to pass under the punch to receive the pads therefrom and to pass over the adhesive strip to retain said pads thereover, means to operate said carrier step by step relatively to the step by step operations of said strips and punches, means to deposit pads from said carrier upon the adhesive strip between steps of said carrier and strips, and means to apply a strip upon the adhesive strip and pads thereon.

22. The combination of means to supply and feed an adhesive strip step by step, means to supply and feed a strip for pads step by step, means to punch holes in said strip and punch the pads having holes therefrom successively, a carrier having receivers to pass under the punch to receive the pads therefrom and to pass over the adhesive strip to retain said pads thereover, means to operate said carrier step by step relatively to the step by step operations of said strips and punches, means to deposit pads from said carrier upon the adhesive strip between steps of said carrier and strips, means to deposit medicament in the holes of said pads between steps of the adhesive strip, and means to apply a strip upon the adhesive strip and the pads and medicament thereon.

23. The combination of means to supply a strip, a rotary cutter and an opposing roll to receive said strip therebetween to cut said strip to shape, means to operate said cutter and roll, means to apply pads upon said strip, and means to apply a strip upon said first named strip and the pads thereon.

24. The combination of means to supply a strip, means to cut and feed said strip step by step, other feeding means for the strip spaced from the first named means and operative step by step therewith, means located between said spaced feeding means for applying pads upon the strip between steps of the latter, and means to apply a strip to the first named strip between the second named feeding means.

25. The combination of means to supply and feed a strip, means to supply another strip for pads, spaced complemental punches and dies to coöperate with said pad and strip, means to feed said strip step by step through said punches and dies, means to cause said punches respectively to punch holes in said strip and punch apertured pads from the strip between steps of the latter, a carrier having receivers for said pads, means to cause said carrier to retain said pads over the first named strip, and means to deposit said pads from the carrier successively upon the first named strip between steps of the latter.

26. The combination of means to supply and feed a strip, means to supply another strip for pads, spaced complemental punches and dies to coöperate with said pad and strip, means to feed said strip step by step through said punches and dies, means to cause said punches respectively to punch holes in said strip and punch apertured pads from the strip between steps of the latter, a carrier having receivers for said pads, means to cause said carrier to retain said pads over the first named strip, a plunger to push the pads from the receivers of the carrier upon the said strip, and means to operate said plunger step by step relatively to the step by step movements of the strips and the carrier.

27. The combination of means to supply a strip, a pair of feeding rolls for said strip, means to rotate said rolls step by step, another pair of feeding rolls spaced from the first named rolls, gearing interposed between said pairs of rolls to rotate them together step by step in corresponding directions, means to apply pads step by step upon said strip between steps of the latter, and means to supply a strip upon the first named strip between the second named feeding rollers.

28. The combination of means to supply a strip, a pair of feeding rolls for said strip, means to rotate said rolls step by step, another pair of feeding rolls spaced from the first named rolls, gearing interposed between said pairs of rolls to rotate them together step by step in corresponding directions, means to apply pads step by step upon said strip between steps of the latter, and means to deposit medicament in holes in said pads on said strip between steps of the latter.

29. The combination of means to supply a strip, a pair of feeding rolls for said strip, means to rotate said rolls step by step, another pair of feeding rolls spaced from the first named rolls, gearing interposed between said pairs of rolls to rotate them together step by step in corresponding directions, means to apply apertured pads step by step upon said strip between steps of the latter, means to deposit medicament in holes in said pads on said strip between steps of the latter, and means to apply a strip between the second named feeding rolls upon the first named pads and medicament thereon.

30. The combination of means to supply and feed an adhesive strip, means to operate said strip step by tep, means to supply a strip for pads, means to guide and operate said strip transversely with respect to the adhesive strip and over the same, means to operate the pad strip step by step, a punch and die for the pad strip, means to operate the punch successively between the steps of the pad strip, a carrier having receivers to register with said punch and die on a plane between planes of said strips, said receivers being adapted to receive pads from said punch and die, and means to rotate said carrier to present the pads in its receivers successively over the adhesive strip, a plunger to push pads from said carrier upon the adhesive strip, means to operate said plunger between steps of the carrier and the adhesive strip.

31. The combination of means to supply and feed a strip, means to apply perforated pads upon said strip, means to supply medicament, means to successively deposit a dose of medicament in the perforations of said pads, and means to feed said strip with the pads thereon successively to the medicament supply.

32. The combination of means to supply and feed a strip, means to apply perforated pads upon said strip, a receptacle for medicament, means to apply a dose of medicament to the pads, and means to feed the strip step by step with the pads to the medicament supply.

33. The combination of means to supply and feed a strip, means to apply perforated pads upon said strip, a receptacle for medicament, means to eject portions of the medicament from the receptacle for succeeding pads, means to remove doses of the medicament for the pads, and means to feed the strip with the pads step by step to the medicament supply.

34. The combination of means to supply and feed a strip, means to apply perforated pads upon said strip, a receptacle for medicament having a discharge orifice therefor, an ejector to force medicament from said nozzle, a cutter to cut off portions of the medicament projecting from the nozzle for the pads, means to operate said cutter, and means to feed said strip and pads relatively to the nozzle.

35. The combination of means to supply and feed a strip, means to apply perforated pads upon said strip, a receptacle for medicament, means to reciprocate the receptacle relatively to the pads, said receptacle having a delivery nozzle, an ejector to push medicament from the nozzle, a cutter to cut off projecting portions of the medicament below the nozzle, and means to reciprocate the receptacle and operate the cutter transversely to the nozzle.

36. The combination of means to supply and feed a strip, means to apply perforated pads upon said strip, a receptacle for medicament having a delivery nozzle, an ejector coöperative with said nozzle, means slidably guiding said receptacle, a cutter, arms supporting the cutter upon the receptacle to move relatively to the nozzle to cut off projecting portions of the medicament, a link operatively connected with the receptacle to reciprocate the latter, arms carrying the cutter and operatively connected with said link, means to operate said link with and independently of the receptacle to cause reciprocation of the receptacle and operation of the cutter relatively to the nozzle, and means to feed the strip and pads relatively to the nozzle.

Signed at New York city, in the county of New York, and State of New York, this 28th day of December, A. D. 1917.

ERNEST D. ANDERSON.

Witnesses:
   T. F. BOURNE,
   MARIE F. WAINWRIGHT.